(12) United States Patent
Schofield et al.

(10) Patent No.: US 7,967,595 B1
(45) Date of Patent: Jun. 28, 2011

(54) MACHINE AND METHOD FOR RESHAPING MULTIPLE PLASTIC BOTTLES INTO ROCK SHAPES

(76) Inventors: John Paul Schofield, Stafford, TX (US); Janet Ellen Schofield, Stafford, TX (US)

( * ) Notice: Subject to any disclaimer, the term of this patent is extended or adjusted under 35 U.S.C. 154(b) by 0 days.

(21) Appl. No.: 12/661,846

(22) Filed: Mar. 25, 2010

Related U.S. Application Data

(60) Provisional application No. 61/211,681, filed on Apr. 2, 2009.

(51) Int. Cl.
*B29C 73/00* (2006.01)
(52) U.S. Cl. ..... 425/384; 425/394; 425/397; 425/403.1; 428/15
(58) Field of Classification Search .................. 425/384, 425/394, 97, 403.1; 428/15
See application file for complete search history.

(56) References Cited

U.S. PATENT DOCUMENTS

| | | | |
|---|---|---|---|
| 14,537 A | 3/1856 | Schrag | |
| 257,126 A | 4/1882 | Andrews | |
| 257,460 A | 5/1882 | Barker | |
| 409,542 A | 8/1889 | Winkler | |
| 444,009 A | 1/1891 | McDonagh | |
| 447,675 A | 3/1891 | Frank | |
| 615,560 A | 12/1898 | Clay et al. | |
| 773,099 A | 10/1904 | Podmore | |
| 850,676 A | 4/1907 | Sanders | |
| 985,603 A | 2/1911 | Kohler | |
| 1,332,457 A | 3/1920 | Burkhardt | |
| 1,371,174 A | 3/1921 | Kiddie | |
| 1,526,364 A | 2/1925 | Norton | |
| 1,553,356 A | 9/1925 | Bennett | |
| 1,814,159 A | 7/1931 | Houseman | |
| 2,480,062 A | 8/1949 | Wahl et al. | |
| 2,485,159 A | 10/1949 | Malarkey | |
| 2,639,465 A | 5/1953 | Green et al. | |
| 2,624,928 A | 1/1959 | Long | |
| 2,996,782 A | 8/1961 | Kovach et al. | |
| 3,095,629 A | 7/1963 | Long | |
| 3,307,502 A | 3/1967 | Armour | |
| 4,093,691 A | 6/1978 | Eggen | |
| 4,218,206 A | 8/1980 | Mullins | |
| 4,222,726 A | 9/1980 | Savage | |
| 4,277,428 A | 7/1981 | Luck et al. | |
| 4,629,594 A | 12/1986 | Munk | |
| 4,678,617 A | 7/1987 | Sykes | |
| 4,836,764 A | 6/1989 | Parkinson | |

(Continued)

*Primary Examiner* — Christina Johnson
*Assistant Examiner* — Xue Liu

(57) ABSTRACT

An apparatus and process for shaping multiple expended thermoplastic containers, specifically plastic bottles into rock shapes by placing the expended plastic bottles into a partitioned tray which is placed onto the top surface of a lift table secured to a jack mounted on a four-wheel dolly and heating the plastic bottles to a malleable state. The lift table is then rolled into an open face shaping chamber that has angle irons secured on the interior sides near the top of the chamber to support and allow a removable tray to which real rocks of different shapes and sizes have been secured to be slid into the chamber with the rocks pointing downward from the tray into the chamber. The lift table with the heated malleable bottles is jacked upward toward and into the real rocks until the bottles take the shapes of the real rocks. Then the table is lowered and wheeled out of the shaping chamber. The number of partitions in the bottle tray corresponds to the number of rocks in the rock tray and the trays can be removed and changed to accommodate bottles and rocks and different numbers and sizes. The apparatus allows for multiple bottles to be processed at one time.

6 Claims, 3 Drawing Sheets

U.S. PATENT DOCUMENTS

| | | |
|---|---|---|
| 4,886,633 A | 12/1989 | Rook et al. |
| 5,082,438 A | 1/1992 | Rook et al. |
| 5,489,200 A | 2/1996 | McGraw et al. |
| 5,832,818 A | 11/1998 | Menzak, Jr. |
| 6,294,114 B1 | 9/2001 | Muirhead |
| 6,387,308 B1 | 5/2002 | Kofahl |
| 6,896,501 B2 | 5/2005 | Jordan |
| 7,115,178 B1 | 10/2006 | Schofield et al. |
| 7,309,226 B2 | 12/2007 | Hausen et al. |
| 7,458,800 B2 | 2/2008 | Scherer et al. |
| 7,600,991 B1 | 10/2009 | Schofield et al. |
| 7,658,601 B2 | 2/2010 | Kasumi |
| 2007/0045897 A1* | 3/2007 | Alexander et al. ............ 264/225 |

* cited by examiner

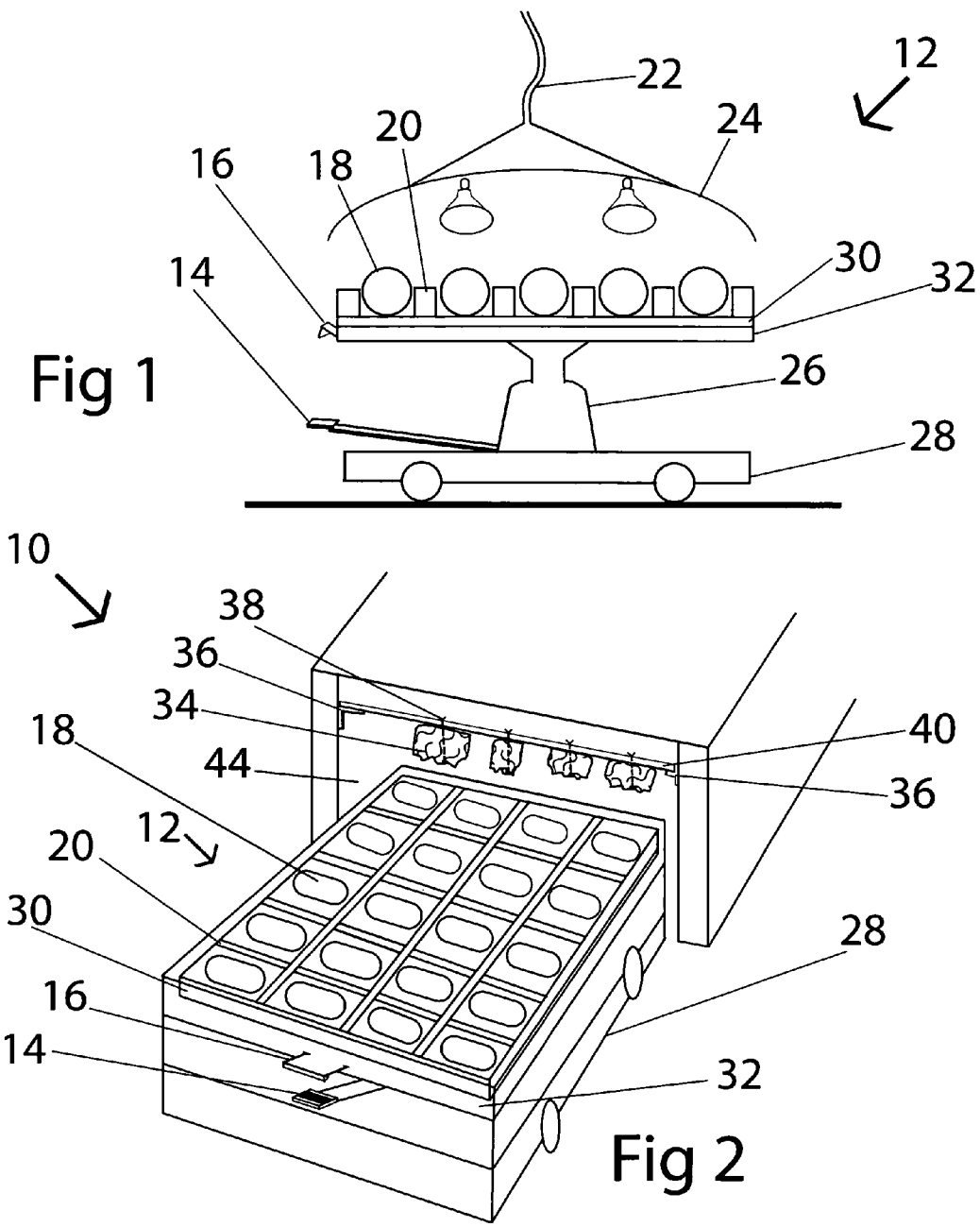

Step 1: Cut off tops and labels from expended plastic beverage bottles.

Step 2: Place the bottles into a partitioned tray on top of a platform on top of a hydraulic lift dolly.

Step 3: Heat the bottles to a malleable state.

Step 4: Wheel the hydraulic lift dolly table with the malleable bottles into a shaping chamber.

Step 5: Pump up the platform with the malleable bottles toward hanging real rocks which are projecting downward from the ceiling of the shaping chamber until the bottles are pressing into the real rocks.

Step 6: Continue pressing the malleable bottles into the real rocks until the bottles have the rock shapes.

Step 7: Lower the lift table with the rock shaped bottles and wheel it out of the shaping chamber.

Step 8: Further alter the shapes of the shaped bottles with heat guns if desired.

Fig 5

MACHINE AND METHOD FOR RESHAPING MULTIPLE PLASTIC BOTTLES INTO ROCK SHAPES

CROSS-REFERENCE TO RELATED APPLICATIONS

This application claims the benefit of provisional patent application Ser. No. 61/211,681, filed Apr. 2, 2009 by the present inventors.

FEDERALLY SPONSORED RESEARCH

Not Applicable

SEQUENCE LISTING OR PROGRAM

Not Applicable

BACKGROUND OF THE INVENTION

1. Field of the Invention

This invention relates generally to a machine and method for reshaping multiple expended plastic bottles into rock shapes, and more specifically to a machine and method that allow multiple expended plastic bottles to be rock shaped at one time.

2. Prior Art

The Applicants currently hold U.S. Pat. Nos. 7,115,118, (Method of Making Plastic Rocks) and 7,600,991, (Plastic Rock Making Machine), which allow for the conversion of used plastic bottles into artificial rocks that look exactly like real rocks, are a fraction of the cost of real rocks, and help the environment by recycling previously wasted, non-biodegradable plastic bottles, and keeping those bottles out of the landfill.

The machine disclosed in U.S. Pat. No. 7,600,991 (2009), to the current inventors allows for producing one rock shaped plastic bottle at a time, and is fine for small or "mom-and-pop" operations.

The present invention allows for processing multiple expended plastic bottles into rock shapes at one time, and therefore allows for heightened efficiency, time savings, and economy, and is better suited for larger operations.

Every year millions of thermoplastic containers are produced, used once, and thrown away. An environmental problem is this created, as these containers are non-biodegradable and fill up an ever-decreasing landfill space.

The present invention enables the conversion of such used containers into articles of renewed utility and thus enables an economically sound solution to the problem of waste disposal, which helps the environment, while at the same time providing valued new articles, specifically lightweight artificial rocks.

Prior art has disclosed various attempts to recycle used materials, and to make artificial rocks from various materials, including concrete and plastics, but most of the inventions used molds and the resulting products looked like they came from a cookie cutter.

U.S. Pat. No. 4,678,617 (1987), to Sykes proposes a machine and method for converting two-liter soda bottles into building blocks. This produces a cookie cutter effect as all of the objects thus produced are the same shape and size. The machine only uses, and so is limited to, soda bottles, and would not be suitable for producing artificial rocks, which need to be of different shapes and sizes to appear real. Also the machine of Sykes' invention only produces one object at a time and so would not be suitable for a large operation.

Also known to the prior art are press machines for producing various materials such as bricks, building blocks, curbstones, paving stones, and the like. These machines may commonly include an overhead mounted press that moves vertically up and down and a table or pallet that feeds laterally toward and under the press. The table may also move vertically up and down in relation to the press. However, these inventions usually use molds and mixtures poured into molds, and do not address recycling of materials.

U.S. Pat. No. 4,222,726 (1980), to Savage discloses a brick press with a removable plunger assembly, which includes a mold table and an overhead plunger assembly over the table an under plunger assembly under the table, all of which can move vertically up and down. The table can also slide vertically into and out of the press, and the plunger assembly can be removed and replaced by means of air cushions. This involves using molds and mixtures of new materials and does not address recycling. Also, each mold box and plunger assembly produces items of the same shape and size and would not be suitable for producing artificial rocks which would need to be of differing shapes and sizes to appear real.

U.S. Pat. No. 4,886,633 (1989), to Rook et al. discusses a method for manufacturing stones in a press, which includes a mold, an overhead stamp above the mold, and a table with a product plate under the mold. The overhead stamp and the table are able to move vertically in relation to the mold. Again, the invention involves putting mixtures of new materials into molds for compression and/or vibration, to produce items of the same shape and height. The stones thus produced have beveled edges and are primarily suitable for use as paving stones. The invention does not address recycling or stones that have different shapes and sizes.

OBJECTS AND ADVANTAGES

Accordingly, several objects and advantages of our invention are to convert multiple used thermoplastic containers, specifically plastic bottles into artificial rocks that, when totally completed, look exactly like real rocks, but are a fraction of the cost of real rocks.

Another object is to make the artificial rocks have different shapes, depths and sizes, like real rocks.

A further object is to greatly help the environment by providing for the recycling of previously wasted, non-biodegradable plastic bottles that take up limited landfill space.

A still further object is to be able to shape many plastic bottles into rock shapes at one time and therefore allow for a larger and more cost and time efficient operation.

Further objects and advantages will become apparent from a consideration of the ensuing description and drawings.

SUMMARY

The present invention pertains to an apparatus and process for shaping multiple expended thermoplastic containers, specifically plastic bottles of all shapes and sizes into realistic rock-like shapes. The apparatus is able to process many bottles at one time.

Accordingly, a machine is provided that reshapes multiple expended bottles into rock shapes. The machine includes an open face shaping box or chamber, which includes a top, a left side, a right side, and a back. Angle irons are secured to the interior left and right sides of the chamber at a predetermined distance near the top of the chamber ceiling to permit a tray, on which multiple real rocks have been secured, to be supported and slid into the chamber. The real rocks extend downward from the tray into the chamber. The machine also includes a four-wheel dolly lift table comprising a table or platform secured to a jack, which jack is secured to a four-wheel dolly. A removable partitioned tray containing multiple expended bottles is placed on the top of the lift table. The bottles are heated by means of heat lamps, heat guns, or other heat producing means to a malleable state. The four-wheel dolly lift table with the now malleable bottles in the tray on top of the table is wheeled through the open face or entrance of the shaping chamber into the chamber and jacked upward toward the tray containing the suspended real rocks until the bottles take the shapes of the real rocks. The platform with the bottles is then lowered and wheeled out of the shaping chamber. The bottles now have rock shapes and are ready for the next stage, which may include; coating the rock shaped bottles with a bonding agent, then with a rough texture material such as stucco that may have a coloring agent mixed into it, or a stain can be put on the stucco after the stucco has been applied and dried.

The trays containing the expended plastic bottles and real rocks are removable and can be changed to provide trays containing different sized bottles and rocks of different shapes and sizes, thus producing items that are of differing shapes and sizes just like those of real rocks.

Preferably the shaping chamber, the rock trays, and the partitioned bottle trays are constructed of heat resistant materials. Also, the shaping chamber may be insulated with a heat retaining material if desired.

BRIEF DESCRIPTION OF THE DRAWINGS

FIG. 1 is a side elevational view of the four-wheel dolly lift table of the invention with unshaped, expended plastic bottles in a partitioned tray on top of the tabletop and heat lamps overhead.

FIG. 2 is a perspective view of the four-wheel dolly lift table of the invention in a lowered position with the not yet reshaped plastic bottles in the partitioned tray on top of the table top, and of the shaping chamber of the invention with the real rocks suspended from the tray on the ceiling of the chamber.

FIG. 5 is a flow chart showing in a general way the steps of the method of reshaping expended plastic bottles into rock shapes by means of the herein disclosed machine.

DETAILED DESCRIPTION OF THE DRAWINGS

Figure 3:
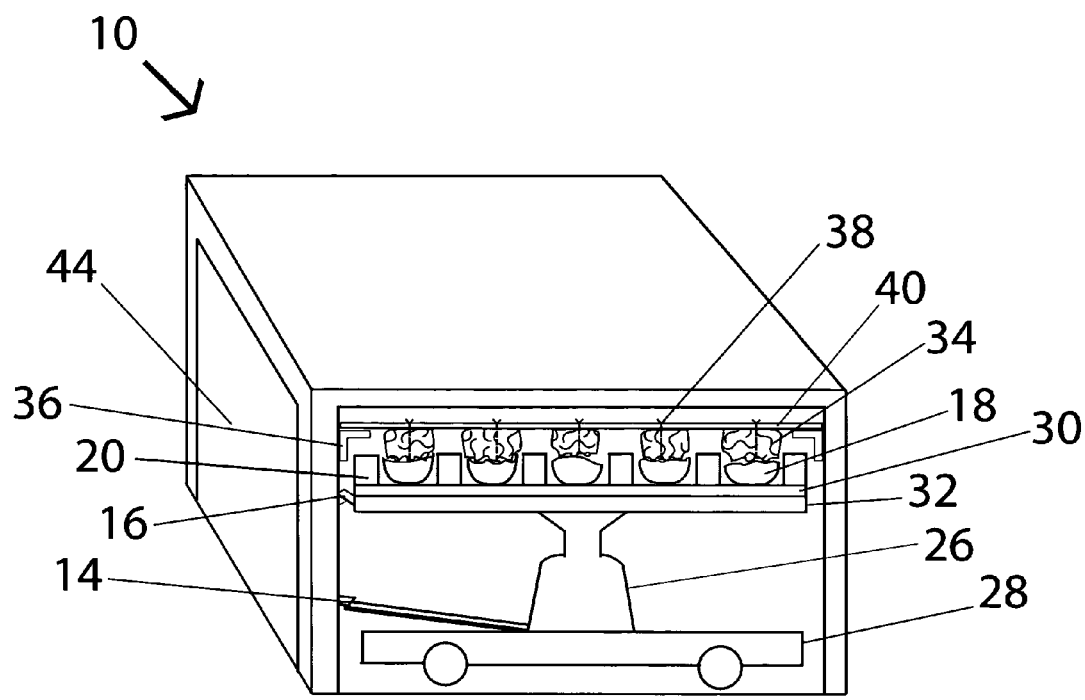
FIG. 3 is a somewhat perspective view of the shaping chamber of the invention with a side exposed to show, in a side elevational view, the four-wheel dolly lift table of the invention in a raised position with the malleable plastic bottles pumped upward into the real rocks of the shaping chamber.

FIG. 1 shows a preferred embodiment of the four-wheel dolly lift table 12 of the current invention. In this embodiment a hydraulic pump jack 26 with a pedal 14 is mounted on a four-wheel dolly cart 28. A table or platform 32 with a handle 16 is secured to the top of the jack 26. A removable tray 30 with partitions 20 is placed on top of the platform 32. Multiple expended plastic bottles 18 with the tops cut off are in between the partitions 20. The partitions 20 in the tray 30 can be removed and reconfigured to accommodate different sized bottles. The size and number of the bottles 18, as determined by the partition 20 arrangements in the tray 30, are meant to correspond with the size and number of real rocks 34, which are suspended from the real rock tray 40 of FIG. 2. Accordingly, multiple plastic bottle trays 30 and real rock trays 40, can be provided in paired sets, in which sets the number and size of the partitions 20 correspond to the number and sizes of the real rocks 34 in the rock trays 40 of FIG. 2.

In this embodiment in FIG. 1 heat lamps 24 for heating the plastic bottles to a malleable state are suspended over the plastic bottles 18 on the tray 30, and have a flexible electrical supply line 22 which can be connected to any conventional outlet (not shown), preferably wired for 220.

FIG. 2 shows the hydraulic lift dolly table 12 in a lowered position, ready to be wheeled or pushed into the entrance 44 of the shaping chamber 10 by means of the handle 16. Expended plastic bottles 18 with the tops cut off and labels removed have been placed in between the partitions 20 on the plastic bottle tray 30, which has been set into place onto the top of the hydraulic lift platform 32. Note that in this embodiment the partitions 20 are configured to permit twenty bottles of similar size to be processed in a single operation. The partitions are provided to keep the bottles from rolling during the process and may be reconfigured to accommodate other amounts and sizes of bottles in other trays, which would be configured to correspond to the number and sizes of real rocks 34 in the removable rock trays 40 in the shaping chamber 10. In this embodiment the shaping chamber 10 is shown with a rock tray 40 from which the real rocks are suspended downward into the interior of the chamber. Angle irons 36 have been installed into the interior left and right sides of the shaping chamber 10 to support the rock tray 40 and allow the rock tray 40 to be easily slid into and out of the shaping chamber 10. The angle irons operate much the same way as drawer glides to support the rock tray 40 and guide the tray easily into and out of the shaping chamber 10. In this embodiment the real rocks 34 are secured to the rock holding tray 40 by means of wing nuts and bolts 38. Again, in this embodiment, the number of real rocks 34 is depicted as corresponding with the number of plastic bottles 18 in the plastic bottle tray 30. This would be twenty rocks, all of which are not shown in this view. And again, other rock trays can be provided to contain numbers and sizes of real rocks to correspond with the numbers and sizes of plastic bottles in corresponding plastic bottle trays. So the number and size of plastic bottles 18 are not limited to that depicted in this preferred embodiment in FIGS. 1,2,3, and 4. The hydraulic lift table 12 is shown in FIG. 2 in a lowered position. The pedal 14 attached to the hydraulic pump jack 26 of FIG. 1, allows the hydraulic lift platform 32 to be pumped up and down as required in the shaping process.

FIG. 3 shows a side view of the hydraulic lift platform 32 inside the shaping chamber 10, as seen through an exposed side of the chamber 10. The hydraulic lift dolly table 12 of FIG. 1 has been wheeled into the shaping chamber 10 through the chamber entrance 44 by means of the platform handle 16. The platform 32 has been pumped upward by means of the jack pedal 14 attached to the hydraulic jack 26. The malleable plastic bottles 18 in the bottle tray 30 are thus pressed into the real rocks 34, and assume the shapes of the real rocks 34. Note that the bottoms of the plastic bottles 18 will flatten out and allow for easier installation of the finished product onto any surface desired. The partitions 20 of the bottle trays 30 keep the bottles 18 from rolling during the shaping operation. Angle irons 36 support the removable rock tray 40, and the angle irons 36 also act as guides for the rock tray 40, which can be slid into and out of the shaping chamber 10. This allows for easy replacement of the real rock tray 40 to contain rocks 34 (to conform) in number and size with those of the plastic bottles 18 in the removable partitioned plastic bottle tray 30. The invention can be provided with multiple pairs of rock trays 40 and bottle trays 30, which will match each other in dimensions and in the number and size of plastic bottles 18 and real rocks 34. Different sized trays can be constructed dependent upon the size of the shaping chamber 10, which also can be constructed in different sizes to meet the needs of the operation.

Figure 4:
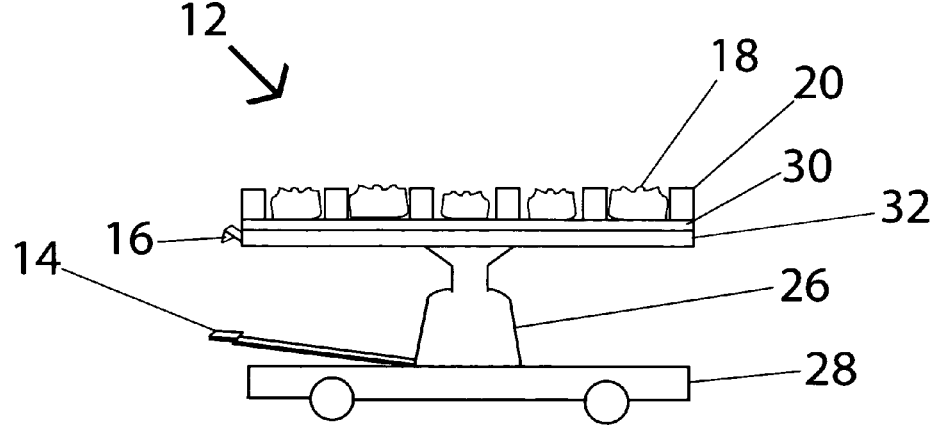
FIG. 4 is a side elevational view of the four-wheel dolly lift table of the invention with rock shaped plastic bottles on the partitioned tray after the table has been lowered and wheeled out of the shaping chamber.

As per FIG. 4, the hydraulic lift dolly table 12, which was lowered in the shaping chamber 10 shown in FIG. 3 by means of the pedal 14 attached to the hydraulic jack 26 on top of the four-wheel dolly cart 28, is shown in a side view after it has been pulled or wheeled out of the shaping chamber 10 of FIG. 3 by means of the handle 16 attached to the hydraulic lift platform 32. The plastic bottles 18 in between the partitions 20 of the tray 30 now have the shapes of the real rocks 34 shown in the shaping chamber 10 in FIG. 3. The shapes can further be altered with a heat gun, (not shown).

FIG. 5 shows in a general way the steps of the method of shaping multiple expended plastic bottles at one time into rock shapes by means of the current invention comprising:

Step 1: The labels and tops of multiple expended plastic beverage bottles are cut off.

Step 2: The bottles thus denuded are placed into the partitioned tray 30, shown in FIG. 1, which is placed on top of the hydraulic lift platform 32 that is on top of the hydraulic lift dolly of FIG. 1.

Step 3: The bottles in the trays are now heated to a malleable state by means of heat lamps 24 as depicted in FIG. 1.

Step 4: The hydraulic lift dolly table with the now malleable bottles is wheeled into the shaping chamber 10 of FIG. 2.

Step 5: The platform with the malleable bottles is now pumped up toward hanging real rocks 34 of FIG. 2, which rocks are projecting downward from the tray installed into the ceiling of the shaping chamber, until the malleable bottles are pressing into the real rocks.

Step 6: The malleable plastic bottles continue to be pressed into the real rocks until the bottles have the real rock shapes.

Step 7: The lift table is now lowered and wheeled out of the shaping chamber.

Step 8: The shapes of the rock shaped bottles are further altered with heat guns if desired.

It is to be understood that the present invention is not limited to the embodiments described above. Since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A machine for shaping multiple plastic bottles into rock shapes comprising:
    (a) an open-face shaping chamber including an entrance, a top, a left side, a right side, and a back side;
    (b) an angle iron mounted to the left side and an angle iron mounted to the right side of the shaping chamber in a predetermined distance near the ceiling of said chamber to support a real rock containing tray;
    (c) multiple removable trays provided wherein multiple real rocks are secured by means of wing nuts and bolts and one of the removable trays at a time can be installed on top of the angle irons in the shaping chamber with said real rocks extending downward into said shaping chamber;
    (d) a four-wheel lift dolly including a four-wheel dolly cart having a jack with an attached pedal mounted thereon, and a platform having an attached handle mounted on top of said jack to receive expended bottle containing trays;
    (e) multiple partitioned removable trays provided to receive multiple expended plastic bottles, which trays can be installed one at a time on top of the dolly lift platform;
    (f) a heating means to heat the expended plastic bottles in the partitioned trays to a malleable state.

2. The machine of claim 1 wherein the shaping chamber, the rock containing trays, the plastic bottle containing trays, and the partitions of the bottle containing trays are constructed of heat resistant materials.

3. The machine of claim 1 wherein the lift platform on the jack is pumped up and down by means of a pedal attached to said jack.

4. The machine of claim 1 wherein the four-wheel lift dolly cart is laterally pushed into and pulled out of the shaping chamber by means of the handle attached to the dolly lift platform.

5. The machine of claim 1 wherein the dimensions of the rock containing trays match the dimensions of the bottle containing trays and the trays are proportioned to fit into the shaping chamber.

6. The machine of claim 1 wherein are provided multiple rock containing and plastic bottle-containing trays in matched sets of two wherein the partitions in the plastic bottle containing tray are configured to accommodate multiple bottles in number and size to correspond to that of the corresponding rock containing tray of the set.

* * * * *